United States Patent [19]
Solter et al.

[11] 3,834,581
[45] Sept. 10, 1974

[54] REVERSE BUCKLING DISC ARRANGEMENT FOR DIRECT MOUNTING

[75] Inventors: Robert L. Solter, Blue Springs; Franklin A. Hansen, Raytown, both of Mo.

[73] Assignee: Continental Disc Corporation, Kansas City, Mo.

[22] Filed: Oct. 2, 1972

[21] Appl. No.: 294,260

[52] U.S. Cl. ................................ 220/89 A, 137/68
[51] Int. Cl. ........................................... F16k 17/40
[58] Field of Search .................................. 220/89 A; 137/68–71

[56] References Cited
UNITED STATES PATENTS

| | | | |
|---|---|---|---|
| 2,225,220 | 12/1940 | Huff | 220/89 A |
| 2,320,211 | 5/1943 | Bloom et al. | 220/89 A |
| 2,336,490 | 12/1943 | Lo Vico | 220/89 A |
| 2,856,096 | 10/1958 | Philip | 220/89 A |
| 3,685,686 | 8/1972 | Raidl | 220/89 A |

*Primary Examiner*—William R. Cline
*Assistant Examiner*—Richard Gerard
*Attorney, Agent, or Firm*—Fishburn, Gold & Litman

[57] ABSTRACT

A safety pressure relief device of the reverse buckling type for mounting directly between ASA type flanges includes a pre-seated bulged disc arrangement secured to or trapped by a centering ring unit containing a knife-blade, the centering ring unit telescoping into a flange bore and operably positioning both the disc arrangement and the knife-blade between and within the flanges, eliminating the need for disc base and disc holddown flanges.

11 Claims, 8 Drawing Figures

3,834,581

REVERSE BUCKLING DISC ARRANGEMENT FOR DIRECT MOUNTING

This invention relates to safety pressure relief devices, and more particularly to improvements in structures for mounting reverse buckling rupture discs and associated puncturing elements.

Reverse buckling rupture discs have found increasing use as precision pressure relief devices which permit working pressures very close to rated rupture pressures. Such devices ordinarily comprise a diaphragm, usually of relatively thin metal, which is centrally bulged and positioned in a pressure relief passageway with the convex surface of the bulge directed toward the higher pressure. To insure rupture when the rated pressure differential is exceeded, a sharp puncturing element, usually in the form of a knife-blade, is located near the concave side of the bulge so that upon disc buckling, the collapsing metal is cut.

Heretofore, a common method of mounting such discs and puncturing elements was by insertion between standard ASA (American Standard Association) pipe flanges with the aid of precision base and holddown flanges which sandwiched the disc flange therebetween to insure proper seating. Usually, the puncturing element was welded or otherwise secured to the holddown flange in position for cutting the disc upon reversal. Recent improvements in such arrangements have been suggested (see our co-pending U.S. Application, Ser. No. 189,567, filed Oct. 15, 1971), however, even in the improved arrangements, disc base and disc holddown flanges are still required.

In the practice of this invention, reverse buckling discs are adapted for mounting, with puncturing elements, directly between ASA type flanges. Specifically, pre-seated bulged discs are assembled in contact with a centering ring unit containing a puncturing element, whereby the centering ring unit operably positions both the pre-seated disc and the puncturing element between the flanges, eliminating the need for disc base and disc holddown flanges.

The principal objects of the present invention are: to provide a reverse buckling disc and puncturing element assembly adapted for mounting directly between ASA type flanges; to provide such an assembly which eliminates the need for disc base and disc holddown flanges; to provide such a reverse disc arrangement which may be quickly placed or replaced into operation without the need for highly skilled personnel; to provide such an arrangement wherein proper seating of the disc is easily obtained for accurate operation; and to provide such an arrangement which is relatively inexpensive and yet highly reliable in use.

Other objects and advantages of this invention will become apparent from the following description taken in connection with the accompanying drawings wherein are set forth by way of illustration and example, certain embodiments of this invention.

Figure 1:
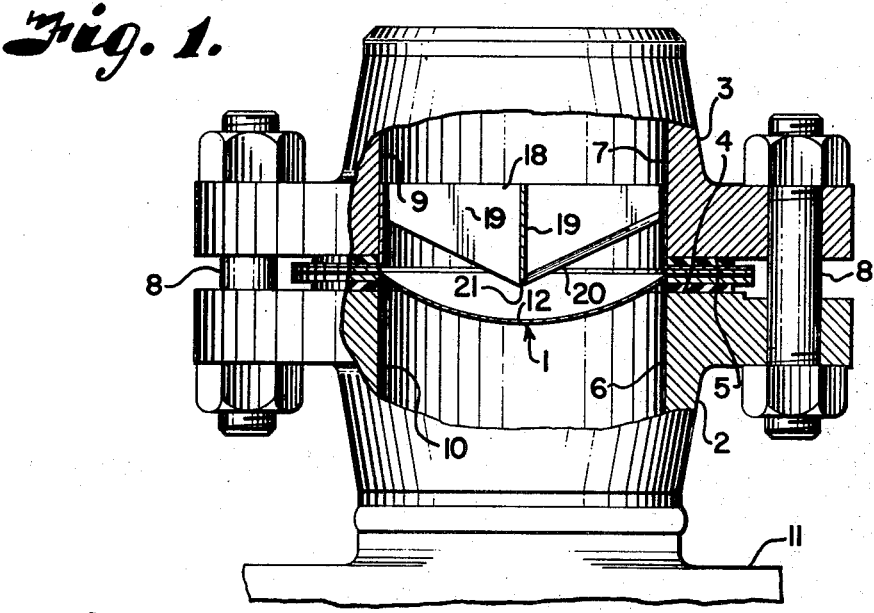
FIG. 1 is a fragmentary, cross-sectional view showing a set of ASA type flanges with a reverse buckling disc arrangement and centering ring with puncturing element embodying this invention assembled directly therewith, a portion being broken away to better show the cooperative arrangement.

Referring to the drawings in more detail:

The reference numeral 1 generally indicates a safety pressure relief device embodying this invention. The device 1 is shown mounted directly between a pair, or set, or ASA type flanges, in this example, lower flange 2 and upper flange 3 which are respectively characterized by bodies forming opposed, flat annular faces 4 and 5 surrounding coaxially aligned lower and upper cylindrical bores 6 and 7. A plurality of bolts 8 extend in a conventional circular pattern through the flanges 2 and 3, drawing the respective flange faces 4 and 5 toward contacting relation.

The device 1, in operation, normally blocks flow out of a pressure relief passageway 9 formed by the upper bore 7. The passageway 9, upon actuation of the device 1, forms a continuation of a passageway 10 formed by the lower bore 6 which communicates with a pressure vessel 11 of any suitable configuration.

Figure 2:
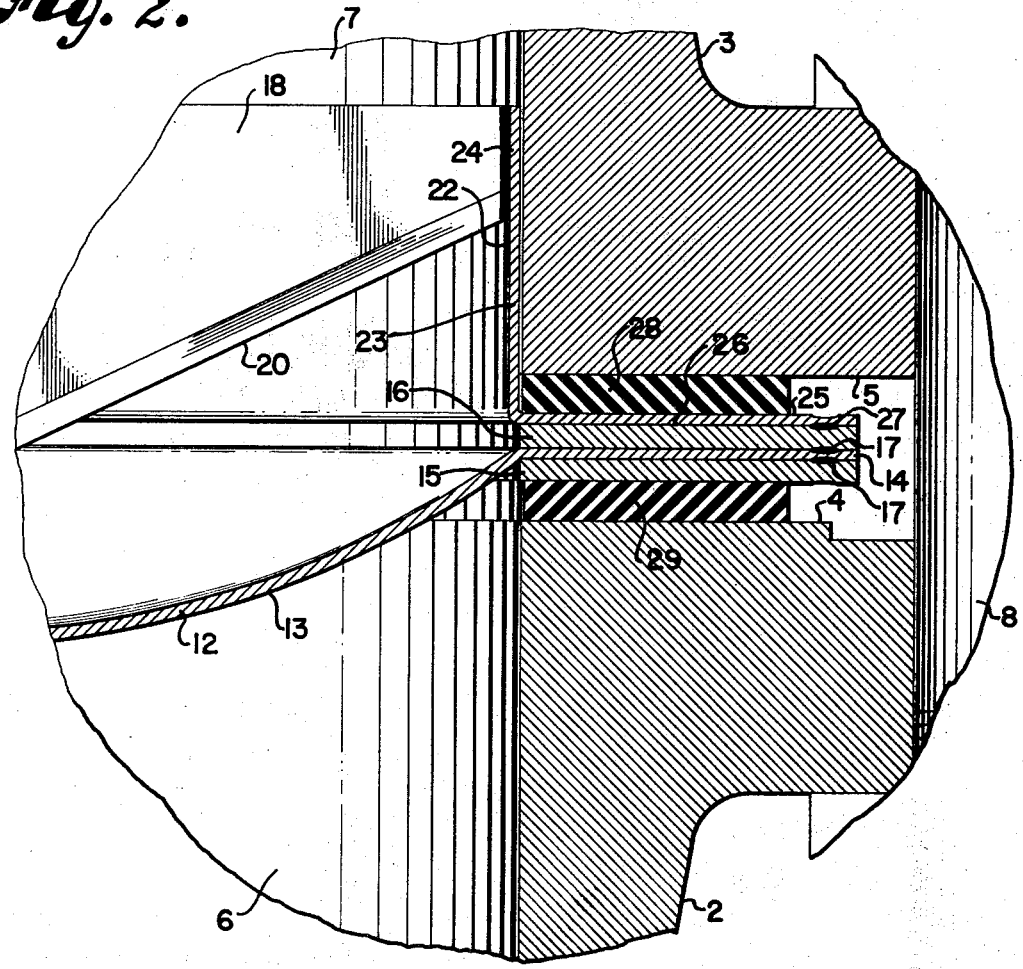
FIG. 2 is a fragmentary, cross-sectional, detail view on an enlarged scale more clearly depicting the relationship of the parts of FIG. 1.

The device 1 includes, in this example, a rupture disc 12 having a central bulged portion 13 projecting into the passageway 10 and an integral, flat rim or flange portion 14 adapted to extend radially between the flange faces 4 and 5. In the structure of FIGS. 1 and 2, seating rings 15 and 16 are respectively accurately positioned on opposite sides of the disc flange portion 14 and permanently secured thereto, for example, by circumferentially spaced spot-welds 17. The bulged portion 13 projects through the seating ring 15 and the seating ring 16 is suitably sized, shaped and positioned to properly support the disc 12 and the area where the bulged portion 13 connects to the flange portion 14.

A disc puncture unit 18 comprises a pair of crossed knife-blades 19 having cutting edges 20 directed toward the concave side of the disc bulged portion 13 and sloping toward a central sharp point 21. The knife-blades 19, in this example, are welded at the ends thereof to the inside cylindrical surface 22 of a centering ring 23. The centering ring 23 is composed of a cylindrical tubular wall portion 24, forming the surface 22, and an integral, flat rim or flange portion 25. The flange portion 25 projects radially along the other surface 26 of the seating ring 16 and, in this example, is secured thereto by a circular pattern of spot-welds 27.

In mounting the device 1 between the flanges 2 and 3, the tubular wall portion 24 of the centering ring 23 is telescoped into the cylindrical bore 7 after placing a suitable sealing gasket 28 between the centering ring flange portion 25 and the flange face 5, FIG. 2. A similar sealing gasket 29 is placed between the seating ring 15 and the flange face 4 and the bolts 8 tightened whereupon the device assumes the operative position between the flanges 2 and 3 illustrated in FIGS. 1 and 2, the need for conventional disc base and disc hold-down flanges (not shown) being eliminated.

Figure 3:
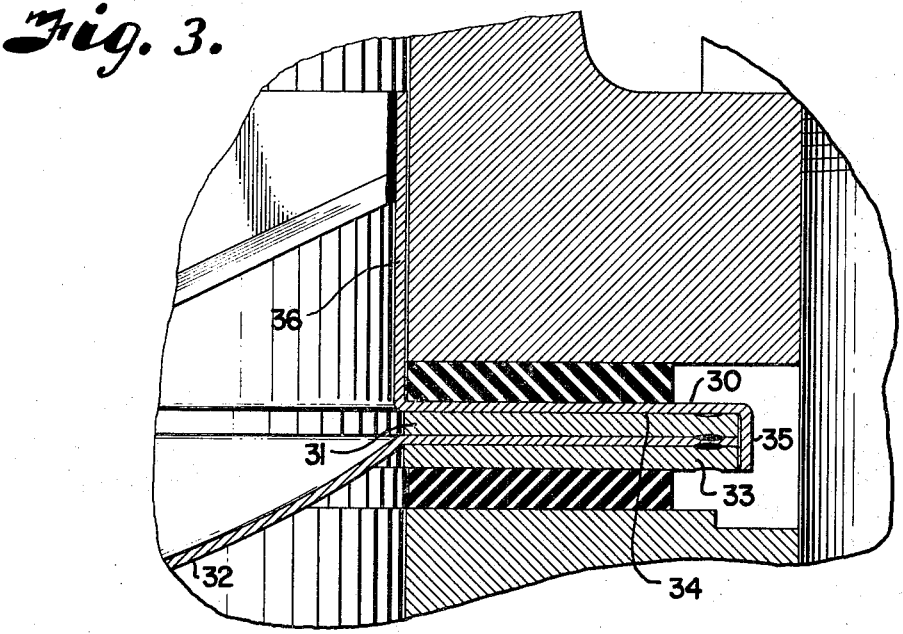
FIG. 3 is a fragmentary, cross-sectional view of a first modified form of this invention utilizing a positioning lip on the centering ring.
Figure 4:
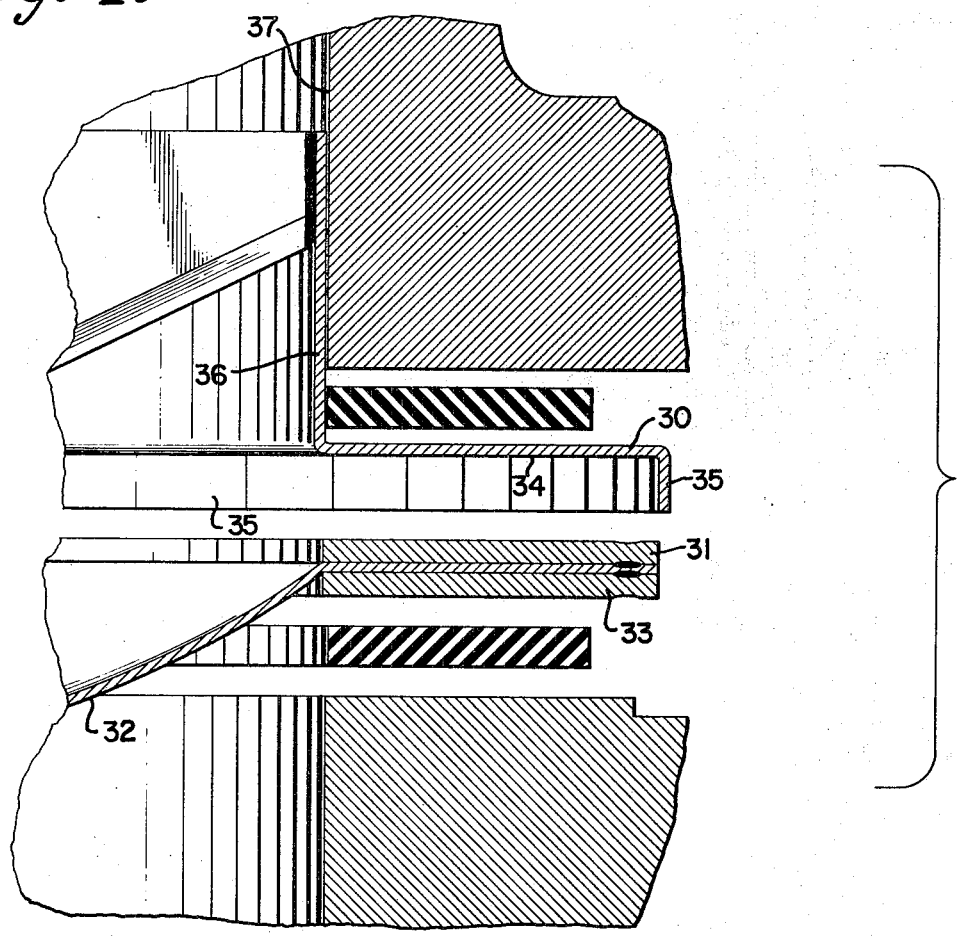
FIG. 4 is a fragmentary, cross-sectional, exploded view further illustrating the structure of FIG. 3.

FIGS. 3 and 4 depict a first modified form of the invention. The structure of FIGS. 3 and 4 is similar to that of FIGS. 1 and 2 except that the centering ring rim or flange portion 30 is not secured to the seating ring 31.

Rather, the disc arrangement, consisting of the seating ring 31, flange of the disc 32 and seating ring 33, is axially received into a shallow cylindrical recess 34 formed by the centering ring flange portion 30 and an integral, cylindrical extension or lip 35 projecting downwardly from the periphery thereof, that is, away from the upwardly projecting centering ring tubular wall portion 36. FIG. 4 particularly illustrates the axial separability of the centering ring and the disc arrangement. However, the positioning of the knife-blade carrying centering ring due to telescopic fitting into the flange bore 37 also produces, upon assembly, proper positioning of the disc 32 by laterally trapping the disc arrangement within the cylindrical recess created by the lip 35.

Figure 5:
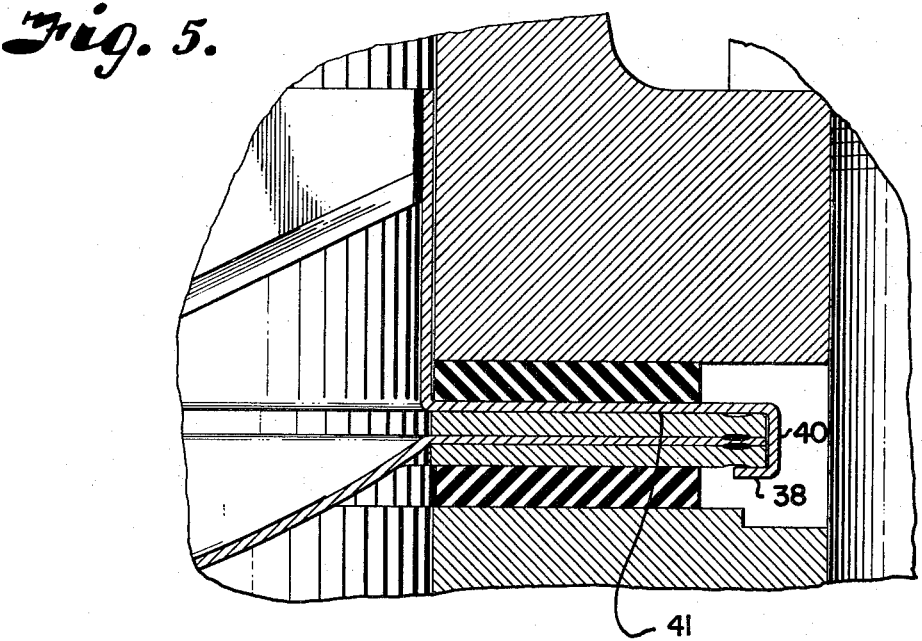
FIG. 5 is a fragmentary, cross-sectional view illustrating a second modified form of this invention utilizing integral tabs on the centering ring lip.
Figure 6:
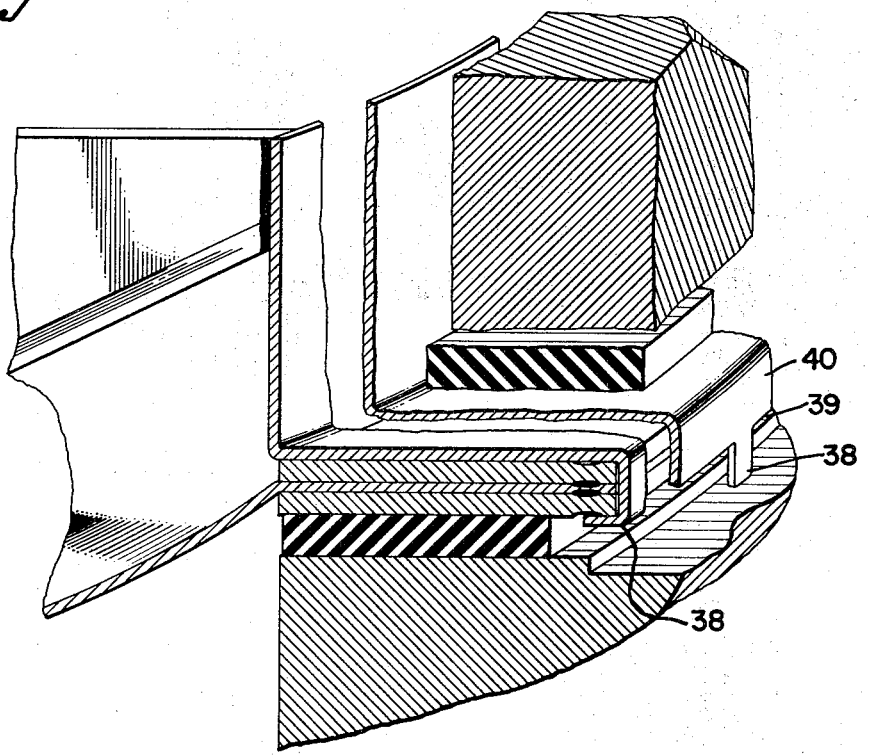
FIG. 6 is a fragmentary, cross-sectional, perspective view showing further details of the structure illustrated in FIG. 5.

FIGS. 5 and 6 depict a second modified form of the invention which is similar to that described in connection with FIGS. 3 and 4 except that a plurality of bendable tabs 38 extend downwardly in spaced, circumferential relation from the free periphery 39 of the lip 40. The tabs 38 are bent inwardly toward the center of the device, thereby securing the disc arrangement within the cylindrical recess 41. This provides a unitary structure, as in the arrangement of FIGS. 1 and 2, but with the knife-blade unit selectively separable, for replacement of the disc as desired.

Figure 7:
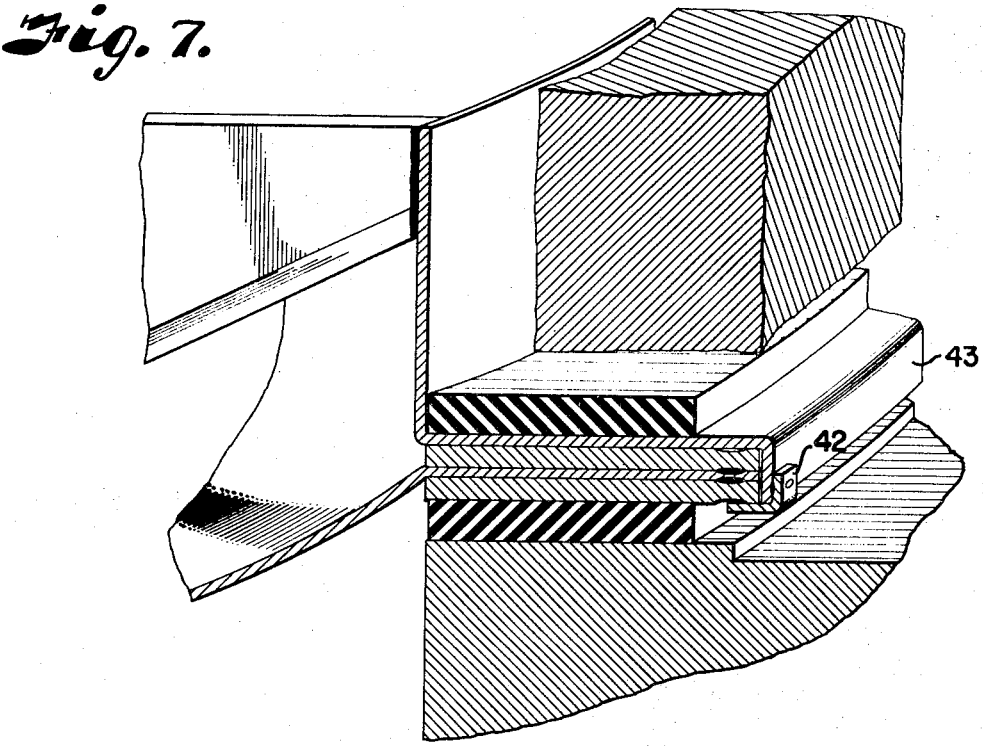
FIG. 7 is a fragmentary, cross-sectional, perspective view illustrating a third modified form of this invention wherein centering ring tabs are separately secured to the centering ring lip.

A third modified form of this invention is illustrated in FIG. 7 and is similar to the form of FIGS. 5 and 6 except that the circumferentially spaced tabs 42 are spot-welded or otherwise secured to the lip 43 rather than formed integrally therewith.

Figure 8:
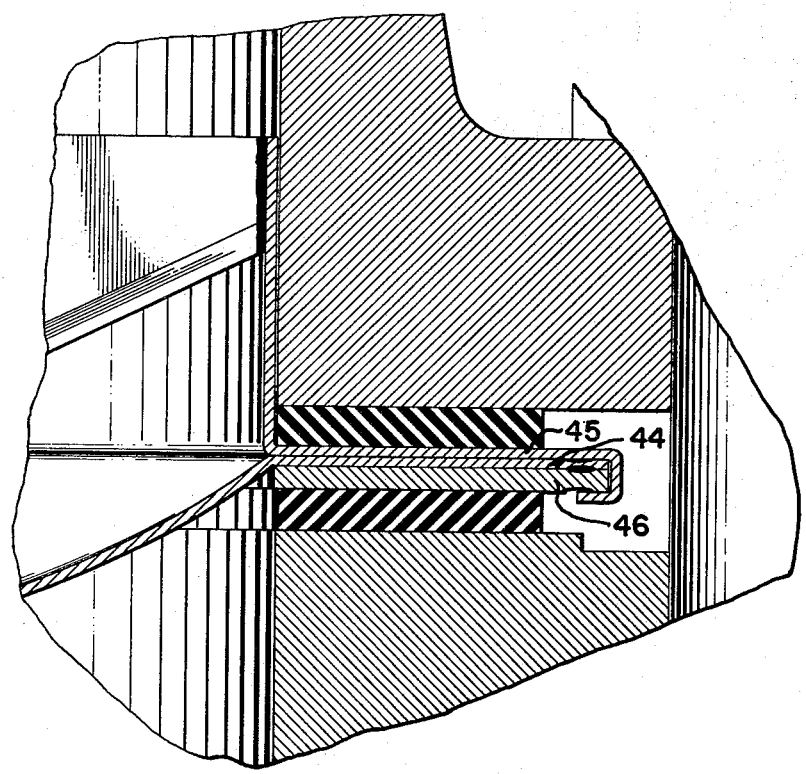
FIG. 8 is a fragmentary, cross-sectional view showing fourth modified form of this invention wherein the function of a disc seating ring is assumed by the flange of the centering ring.

FIG. 8 depicts a fourth modified form of this invention characterized by the absence of a seating ring between the disc flange portion 44 and the centering ring flange portion 45. A seating ring 46 is utilized on the convex side of the disc as in the above noted structures, however, the centering ring flange portion 45 assumes the upper seating ring function in this embodiment, thereby further reducing the cost of the assembly.

It is to be understood that while certain forms of this invention have been illustrated and described, it is not to be limited thereto except insofar as such limitations are included in the following claims.

What is claimed and desired to secure by Letters Patent is:

1. In combination, an inlet pipe flange and an outlet pipe flange and a safety pressure release device mounted between said flanges:
   a. said inlet and outlet flanges respectively having radially projecting opposed clamping faces, said outlet flange having a bore extending to said outlet flange face forming a corner therewith,
   b. said relief device comprising a rupture disc arrangement having a flange portion extending therefrom,
   c. a centering ring comprising a tubular wall portion and a flange portion, and puncturing means mounted at least partially within said tubular wall portion,
   d. said tubular wall portion being telescopically closely received into said outlet bore,
   e. means cooperating between said centering ring flange portion and disc arrangement flange portion whereby said flange portions are radially coaxially retained with respect to each other in absence of said pipe flanges, and
   f. means clamping said flange portions between said pipe flanges.

2. The combination as set forth in claim 1 wherein:
   a. said rupture disc arrangement is of the reverse buckling type having a bulged central portion directed away from said puncturing means.

3. The combination as set forth in claim 1 wherein:
   a. said rupture disc arrangement flange portion extends radially from a bulged central disc portion.

4. The combination as set forth in claim 1 wherein:
   a. said rupture disc arrangement includes seating ring means secured to at least one side of a rupture disc flange.

5. The combination as set forth in claim 1 wherein:
   a. said rupture disc arrangement includes a rupture disc having a flange and a seating ring secured to one side of said rupture disc flange,
   b. said centering ring flange portion being in contact with the other side of said rupture disc flange.

6. The combination as set forth in claim 1 wherein:
   a. said cooperating means comprises a weld.

7. The combination as set forth in claim 1 wherein:
   a. said cooperating means includes exetension means on said centering ring flange portion in the form of a lip for receiving said rupture disc arrangement flange portion thereagainst.

8. The combination as set forth in claim 7 wherein:
   a. said lip is a continuous cylindrical lip.

9. The combination as set forth in claim 8 wherein:
   a. tabs extend from said lip and secure said rupture disc arrangement against axial separation from said centering ring flange portion.

10. The combination as set forth in claim 7 wherein:
    a. said extension means includes integral tabs.

11. The combination as set forth in claim 9 wherein:
    a. said tabs are secured to said lip.

* * * * *